United States Patent [19]
Dokos

[11] Patent Number: 5,702,335
[45] Date of Patent: Dec. 30, 1997

[54] REMOTE DRILL BIT LOADER

[75] Inventor: James A. Dokos, Idaho Falls, Id.

[73] Assignee: United States Department of Energy, Washington, D.C.

[21] Appl. No.: 614,871

[22] Filed: Mar. 13, 1996

[51] Int. Cl.⁶ .................................................. B23Q 3/157
[52] U.S. Cl. ........................................... 483/1; 483/55
[58] Field of Search .......................... 483/54, 55, 61, 483/56, 1

[56] References Cited

U.S. PATENT DOCUMENTS

| | | | |
|---|---|---|---|
| 3,973,863 | 8/1976 | Smith | 483/55 |
| 4,674,172 | 6/1987 | Botimer | 483/55 |
| 4,819,320 | 4/1989 | Cairns et al. | 483/55 X |
| 5,111,573 | 5/1992 | Ito et al. | 483/61 X |

FOREIGN PATENT DOCUMENTS

| | | | |
|---|---|---|---|
| 2555927 | 6/1985 | France | 485/55 |
| 2844088 | 5/1980 | Germany | 483/55 |
| 3341252 | 5/1985 | Germany | 483/54 |
| 82146 | 7/1981 | Japan | 483/55 |
| 1077752 | 3/1984 | U.S.S.R. | 483/55 |

*Primary Examiner*—William R. Briggs
*Attorney, Agent, or Firm*—Virginia B. Caress; William R. Moser; Paul A. Gottlieb

[57] ABSTRACT

A drill bit loader for loading a tapered shank of a drill bit into a similarly tapered recess in the end of a drill spindle. The spindle has a transverse slot at the inner end of the recess. The end of the tapered shank of the drill bit has a transverse tang adapted to engage in the slot so that the drill bit will be rotated by the spindle. The loader is in the form of a cylinder adapted to receive the drill bit with the shank projecting out of the outer end of the cylinder. Retainer pins prevent rotation of the drill bit in the cylinder. The spindle is lowered to extend the shank of the drill bit into the recess in the spindle and the spindle is rotated to align the slot in the spindle with the tang on the shank. A spring unit in the cylinder is compressed by the drill bit during its entry into the recess of the spindle and resiliently drives the tang into the slot in the spindle when the tang and slot are aligned.

8 Claims, 2 Drawing Sheets

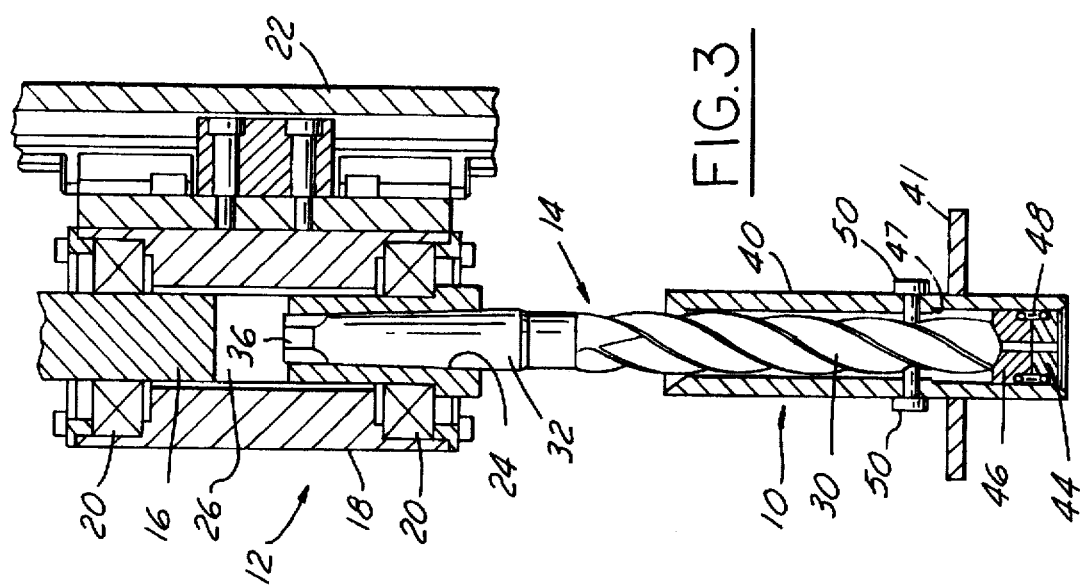
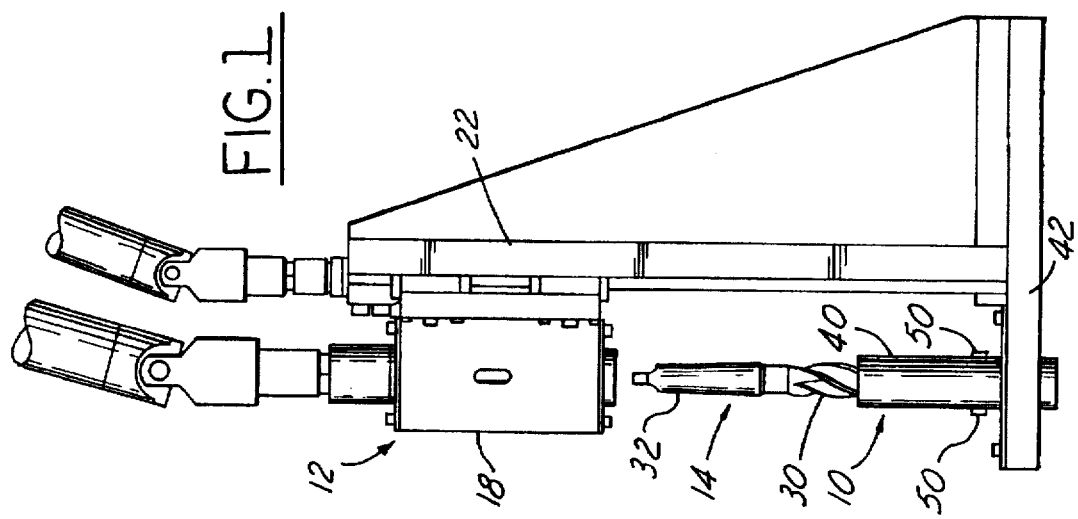

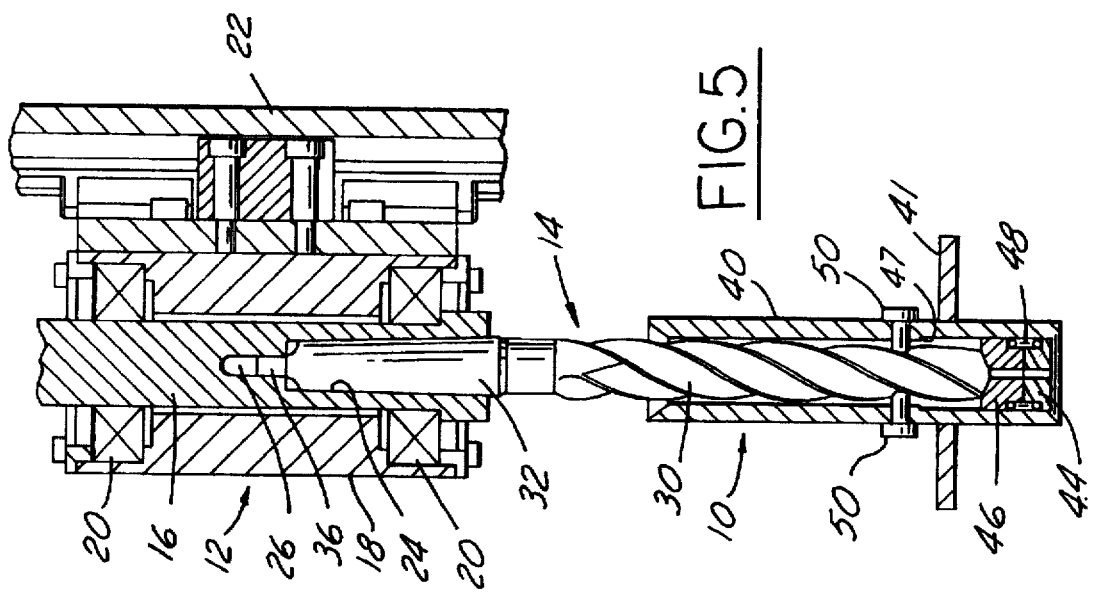
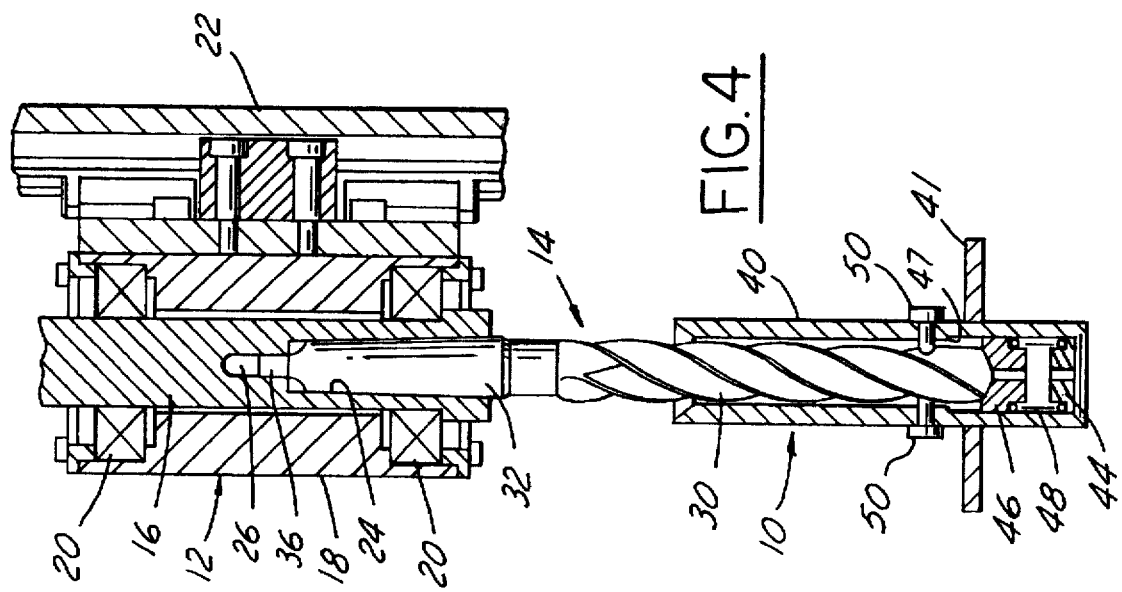

5,702,335

REMOTE DRILL BIT LOADER

GOVERNMENT CONTRACT

The United States Government has rights in this invention pursuant to a contract awarded by the United States Department of Energy.

FIELD OF THE INVENTION

This invention relates generally to drill bit holders and more particularly to a drill bit holder for use in remote or hazardous drilling operations.

BACKGROUND OF THE INVENTION

In typical remote drilling operations, whether in hot cells or water pits, drill bits have been held using a collet or end mill type holder with set screws. In either case, to load or change a drill bit required the use of master-slave manipulators to position the bits and tighten the collet or set screws. This requirement eliminated many otherwise useful work areas because they were not equipped with slaves, particularly in water pits.

What is needed is a device which permits loading drill bits remotely without the use of master-slave manipulators, thus making more efficient use of available work space and reducing the chance of personnel radiation exposure.

SUMMARY OF THE INVENTION

In accordance with the present invention, a drill bit loader is provided for use in remote or hazardous drilling operations without the need for electromechanical or master-slave manipulators. The loader preferably consists of a cylinder to hold the taper shank drill bit straight, pins inserted through the sides of the cylinder to restrict rotation of the drill bit, and a spring-loaded piston at the bottom of the cylinder to permit vertical motion of the drill bit by opposing the spring force. The drill bit is retained in a recess in the spindle of the drill by closely matched tapers on the drill bit and in the recess. Preferably, the drill bit has a tang on the end which fits into a slot at the inner end of the recess so that torque may be transmitted from the spindle to the drill bit.

There are many uses for the drill bit loader. For example, the loader may be used as part of the equipment for restraining control rods in nuclear fuel prior to long-term storage. This entire operation has to be performed remotely, under water in a work area incapable of being fitted with master-slave manipulators. Were it not for the remote drill bit loader of this invention, it would be necessary to bring the entire drill to the water surface to change drill bits. Where this is physically possible, it would require much more time and create much more work since the drill would have to be decontaminated each time prior to raising it to prevent encountering excessive radiation levels. Another approach would be to raise the drill into a glove box for drill bit changeout. Although contamination would not be a concern in this instance, unless drilling chips were removed prior to the movement, excessive radiation still would be a problem.

One object of this invention is to provide a remote drill bit loader having the foregoing features and capabilities.

Another object is to provide a remote drill bit loader which is composed of a relatively few simple parts, is rugged and durable in use, and is capable of being inexpensively manufactured and readily assembled and operated.

These and other objects, features and advantages will become more apparent as the following description proceeds, especially when considered with the accompanying drawings.

BRIEF DESCRIPTION OF THE DRAWINGS

FIG. 1 is an elevational view showing a loader constructed in accordance with this invention supporting a drill bit in position for loading into the spindle of a drill.

FIG. 2 is an enlarged sectional view of the loader shown in FIG. 1, and a drill bit supported in the loader.

FIG. 3 is a sectional view showing the drill bit supported in the loader after the spindle has been lowered so that the tapered shank of the drill bit is partially inserted in a recess in the spindle and the spring in the loader compressed. However, as there shown, the drill bit tang is misaligned with the slot in the spindle.

FIG. 4 is similar to FIG. 3, but shows the spindle rotated to align the slot with the tang so that the tang is inserted into the slot.

FIG. 5 is similar to FIG. 4, showing the drill bit fully installed in the spindle and the spring in the loader fully compressed.

DETAILED DESCRIPTION OF A PREFERRED EMBODIMENT

Referring now more particularly to the drawings, a loader 10 constructed in accordance with the invention is shown beneath a drill 12. The loader supports an elongated drill bit 14 in position to be loaded into the drill.

The drill 12 is of well-known construction and comprises an elongated vertical spindle 16 supported for rotation in a drill housing 18 by bearings 20. The drill housing is mounted on a supporting frame 22 for vertical sliding movement. The motors for raising and lowering the drill and for rotating the spindle are not shown but are of standard construction.

The spindle 16 has an elongated vertical, central recess 24 at the lower end which is circular in cross-section but tapered slightly from the lower end of the spindle up to the inner end of the recess. The spindle has a transverse slot 26 extending across the inner end of the recess 24.

The drill bit 14 is an elongated member having a fluted lower end portion 30 for cutting and an upper end portion or shank 32. The shank is circular in cross-section but tapered to match the taper of the recess 24 in the spindle. A tang 36 at the upper end of the shank is of approximately the same width as the slot to have a close driving fit therein.

The loader 10 comprises an elongated cylinder 40 supported in vertical, upright position by an integral seating flange 41 in an opening in the drill base 42. The cylinder 40 in this position is axially aligned with the recess 24 in the spindle. The upper end of the cylinder is open so that the cylinder may receive the fluted lower end portion 30 of the drill bit 14. The tapered shank 32 of the drill bit projects outwardly beyond the open upper end of the cylinder. A retainer 44 is fixed in the bottom of the cylinder. A piston 46 above the retainer 44 slides in the cylinder in an enlarged portion thereof beneath shoulder 47. The shoulder 47 limits upwardly movement of the piston 46. A compression coil spring 48 in the cylinder is disposed between the piston 46 and the retainer 44. The spring 48 is under compression even in the upper limiting position of the piston 46 shown in FIG. 2 and holds the piston in this position. In order to retain the drill bit from rotating while in the cylinder, at least one and preferably two retainer pins 50 are provided. These pins preferably thread through the cylinder wall in circumferentially spaced relation to one another and project radially inwardly into the cylinder to a position in which their inner ends engage the drill bit between flutes to prevent the drill bit from rotating.

Reference has previously been made to the difficulties in changing drill bits in typical remote drilling operations. By using the remote drill loader of this invention, these problems are not encountered since the drill bit changeout is accomplished with the drill in place at the work station. In the use of the invention as thus described, the drill 12 is first raised preferably to the vertical travel limit. The loader 10 with a drill bit 14 in place in the cylinder can be mounted on the end of a probe pole and then slipped beneath the spindle 16 and into the opening in the drill base 42 as shown in FIG. 1. In this position, the drill bit 14 is axially aligned with the recess 24. The spindle is then lowered until the tapered shank 32 of the drill bit has entered the spindle recess and the spring 48 has been compressed as shown in FIG. 3. The spindle is now rotated until the slot 26 at the top of the recess is aligned with the tang 36 on the end of the drill bit as shown in FIG. 4. The drill bit is prevented from rotating by the pins 50 which protrude into the drill bit flutes. Once the tang snaps into the slot under pressure of the compressed spring, the spindle is lowered further until the loader piston 20 bottoms out, setting the drill bit as shown in FIG. 5. The spindle 16 and drill bit 14 are then retracted and the loader 10 is removed, making the drill ready for use.

Removal of drill bits can be accomplished in the normal manner by inserting a tapered drift into the slot in the spindle and wedging the drill bit loose.

I claim:

1. A drill bit loader, for loading a tapered shank of a drill bit into a similarly tapered recess in the end of an axially movable and rotatable drill spindle, said drill bit loader comprising:

an elongated cylinder having an open outer end and adapted to receive the drill bit axially therewithin with the tapered shank of the drill bit projecting outwardly beyond the outer end of the cylinder, means mounting the cylinder with its outer end adjacent to the spindle and in alignment with the spindle recess so that the shank of the drill bit received in said cylinder will enter the recess in the spindle when the spindle and cylinder are relatively moved axially toward one another, means for preventing rotation of the drill bit while received in the cylinder, and a yieldable support in said cylinder for supporting the drill bit during its entry into the recess.

2. A method of loading a tapered shank of an elongated drill bit into a similarly tapered elongated recess in the end of an axially movable and rotatable drill spindle, wherein the recess has an inner end within the spindle, the spindle has a transverse slot at the inner end of the recess, and the tapered shank has an end provided with a transverse tang adapted to engage in said slot when said tang is aligned with said slot, said method comprising:

providing an elongated cylinder having an open outer end and adapted to receive the drill bit axially therewithin with the tapered shank of the drill bit projecting out of the outer end of the cylinder and the transverse tang disposed outwardly beyond said outer end of the cylinder, mounting the cylinder with its outer end adjacent to the spindle and in alignment with the spindle recess, axially moving the spindle toward the cylinder so that the shank of the drill bit will enter the recess in the spindle, rotating the spindle to align the tang and slot, retaining the drill bit from rotation when the spindle is rotated, and applying spring pressure on the drill bit during its entry into the recess to resiliently drive said tang into the slot in said spindle when the tang and slot aligned.

3. A drill bit loader for loading a tapered shank of an elongated drill bit into a similarly tapered elongated recess in the end of an axially movable and rotatable drill spindle, wherein the recess has an inner end within the spindle, the spindle has a transverse slot at the inner end of the recess, and the tapered shank has an end provided with a transverse tang adapted to engage in said slot when said tang is aligned with said slot, said drill bit loader comprising:

an elongated cylinder having an open outer end and adapted to receive the drill bit axially therewithin with the tapered shank of the drill bit projecting out of the outer end of the cylinder and the transverse tang disposed outwardly beyond said outer end of the cylinder, means mounting the cylinder with its outer end adjacent to the spindle and in alignment with the spindle recess so that the shank of the drill bit received in the cylinder will enter the recess when the spindle is moved axially toward the cylinder, means for preventing rotation of the drill bit received in said cylinder when the spindle is rotated to align said slot with said tang, and a spring unit in said cylinder adapted to be compressed by the drill bit during its entry into the recess and to resiliently drive said tang into the slot in said spindle when the tang and slot are aligned.

4. A drill bit loader according to claim 3, wherein said means for preventing rotation of the drill bit comprises a plurality of pins carried by said cylinder, said pins projecting radially inwardly into said cylinder and adapted to engage the drill bit.

5. A drill bit loader according to claim 3, wherein said spring unit comprises a piston in said cylinder to support the drill bit, and a compression spring supporting the piston.

6. A drill bit loader according to claim 3, wherein said cylinder is disposed upright with its outer end at the upper extremity thereof, said spring unit comprises a piston adjacent to the lower extremity of said cylinder to support the drill bit, a retainer in said cylinder beneath the piston, and a compression coil spring in the cylinder between said piston and said retainer.

7. A drill bit loader according to claim 6, wherein said means for preventing rotation of the drill bit comprises a plurality of elongated pins axially mounted on said cylinder, said pins projecting radially inwardly into said cylinder and adapted to engage the drill bit.

8. A method of loading a tapered shank of a drill bit into a similarly tapered recess in the end of an axially movable and rotatable drill spindle, said method comprising:

providing an elongated cylinder having an open outer end and adapted to receive the drill bit axially therewithin with the tapered shank of the drill bit projecting outwardly beyond the outer end of the cylinder, mounting the cylinder with its outer end adjacent to the spindle and in alignment with the spindle recess, relatively moving the cylinder and spindle axially toward one another so that the shank of the drill bit received in said cylinder will enter the recess in the spindle, retaining the drill bit from rotation while it enters the recess, and yieldably supporting the drill bit in said cylinder during its entry into the recess.

* * * * *